United States Patent
Don et al.

(10) Patent No.: US 11,809,268 B1
(45) Date of Patent: Nov. 7, 2023

(54) DISCOVERING HOST-SWITCH LINK AND ISL ISSUES FROM THE STORAGE ARRAY

(71) Applicant: Dell Products L.P., Hopkinton, MA (US)

(72) Inventors: Arieh Don, Newton, MA (US); Scott Rowlands, Marietta, GA (US); Erik Smith, Douglas, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/857,517

(22) Filed: Jul. 5, 2022

(51) Int. Cl.
*G06F 11/07* (2006.01)
*H04L 67/1097* (2022.01)

(52) U.S. Cl.
CPC .......... *G06F 11/079* (2013.01); *G06F 11/076* (2013.01); *G06F 11/0772* (2013.01); *H04L 67/1097* (2013.01)

(58) Field of Classification Search
CPC ... G06F 11/079; G06F 11/076; G06F 11/0772
See application file for complete search history.

(56) References Cited

U.S. PATENT DOCUMENTS

| 10,944,372 | B2* | 3/2021 | Woolsey | H03H 3/04 |
| 2002/0191537 | A1* | 12/2002 | Suenaga | G06F 11/0727 714/E11.026 |
| 2006/0227702 | A1* | 10/2006 | Ash | G06F 11/0727 370/216 |

* cited by examiner

*Primary Examiner* — Nadeem Iqbal
(74) *Attorney, Agent, or Firm* — Anderson Gorecki LLP

(57) ABSTRACT

A congestion and failure detector and localizer running on a storage array locally monitors ports of the storage array for IO failures and local link errors and remotely monitors ports of host initiators and host-side and storage array-side switches for link errors. Based on whether the local link error rate is increasing at any ports, whether IO failures are associated with a single host initiator port, and whether link error rate is increasing on both the host initiator and initiator-side switch, the congestion and failure detector and localizer generates a flag indicating either a physical link problem between the storage array and adjacent switch, ISL physical issue or spreading congestion, host initiator-side physical link problem, or path congestion. The flag identifies the storage array port, issue type, link, fabric name, and host initiator.

20 Claims, 7 Drawing Sheets

Flag 700

FCID/WWN OF DETECTING ARRAY PORT
SUSPECTED ISSUE TYPE (PHYSICAL OR CONGESTION)
SUSPECTED LINK (LOCAL, INITIATOR-SIDE, ISL)
FABRIC NAME
INITIATOR FCID/WWN (IF APPLICABLE)

Figure 7

DISCOVERING HOST-SWITCH LINK AND ISL ISSUES FROM THE STORAGE ARRAY

TECHNICAL FIELD

The subject matter of this disclosure is generally related to detection and localization of congestion and failures in a data center.

BACKGROUND

Data centers include high-capacity, multi-user data storage systems such as storage area networks (SANs) with storage arrays that maintain storage objects that are contemporaneously accessed by multiple instances of host applications running on clusters of host servers. The storage arrays and host servers are interconnected via multiple layers of network nodes such as fiber channel switches. Performance of the host application instances is a function of performance of the host server on which the instance runs, data access latency of the storage array, and performance of the interconnecting network nodes, including physical communication links between nodes. Detecting and localizing congestion and failures in such a complex system is a difficult manual process.

SUMMARY

A method in accordance with some implementations comprises monitoring TO failures detected at ports of a storage array; monitoring link errors detected at the ports of the storage array; remotely monitoring link errors detected at initiator ports of a host server; remotely monitoring link errors detected at ports of a switch adjacent to the host server; and detecting and localizing a problem based on the monitored IO failures and link errors.

An apparatus in accordance with some implementations comprises a plurality of interconnected compute nodes that manage access to data stored on a plurality of managed drives; and a congestion and failure detector and localizer running on at least one of the compute nodes and configured to: monitor IO failures detected at ports of a storage array; monitor link errors detected at the ports of the storage array; remotely monitor link errors detected at initiator ports of a host server; remotely monitor link errors detected at ports of a switch adjacent to the host server; and detect and localize a problem based on the monitored IO failures and link errors.

In accordance with some implementations, a non-transitory computer-readable storage medium stores instructions that are executed by a storage array to perform a method comprising: monitoring IO failures detected at ports of the storage array; monitoring link errors detected at the ports of the storage array; remotely monitoring link errors detected at initiator ports of a host server; remotely monitoring link errors detected at ports of a switch adjacent to the host server; and detecting and localizing a problem based on the monitored IO failures and link errors.

This summary is not intended to limit the scope of the claims or the disclosure. Other aspects, features, and implementations will become apparent in view of the detailed description and figures. Moreover, all the examples, aspects, implementations, and features can be combined in any technically possible way.

BRIEF DESCRIPTION OF THE FIGURES

FIG. 7 illustrates a flag generated by the congestion and failure detector and localizer.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
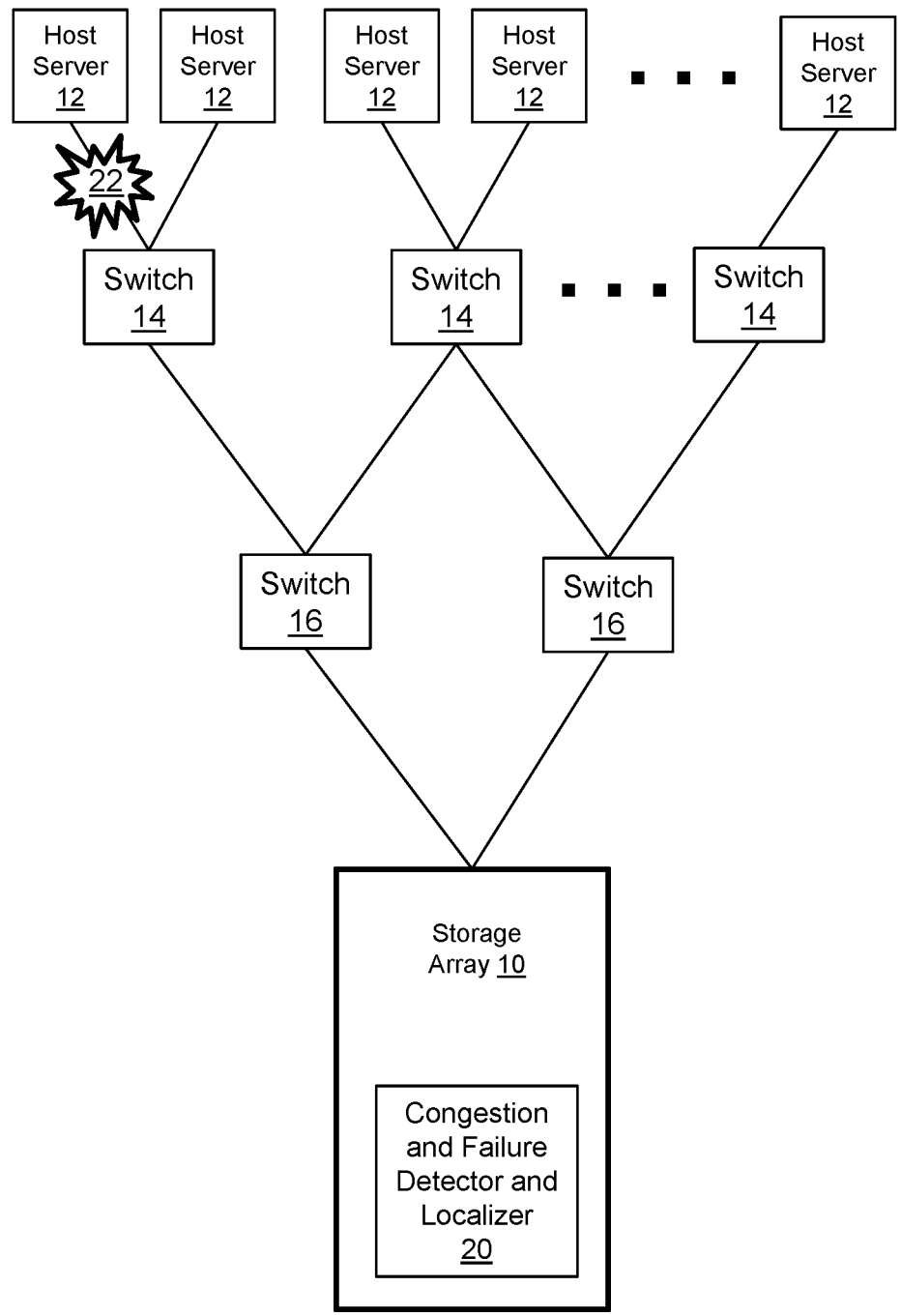
FIG. 1 illustrates a storage system including a storage array with a congestion and failure detector and localizer.

FIG. 1 illustrates a storage system that includes a storage array 10 with a congestion and failure detector and localizer 20. The storage array maintains storage objects that are accessed by instances of host applications running on host servers 12. The host servers communicate with the storage array via multiple layers of switches, including a layer of switches 16 that are logically adjacent to the storage array and a layer of switches 14 that are logically adjacent to the host servers. The switches 14 that are logically adjacent to the host servers 12 are more numerous than the switches 16 that are logically adjacent to the storage array 10. Congestion or a fault 22 can occur in one or more of the host servers, switches, storage array, and physical links between those nodes. In the illustrated example a problem 22 occurs in a link between one of the host servers 12 and switches 14. The congestion and failure detector and localizer 20 running on the storage array is configured to detect and localize the problem based on ongoing monitoring and mapping as will be explained below.

Figure 2:
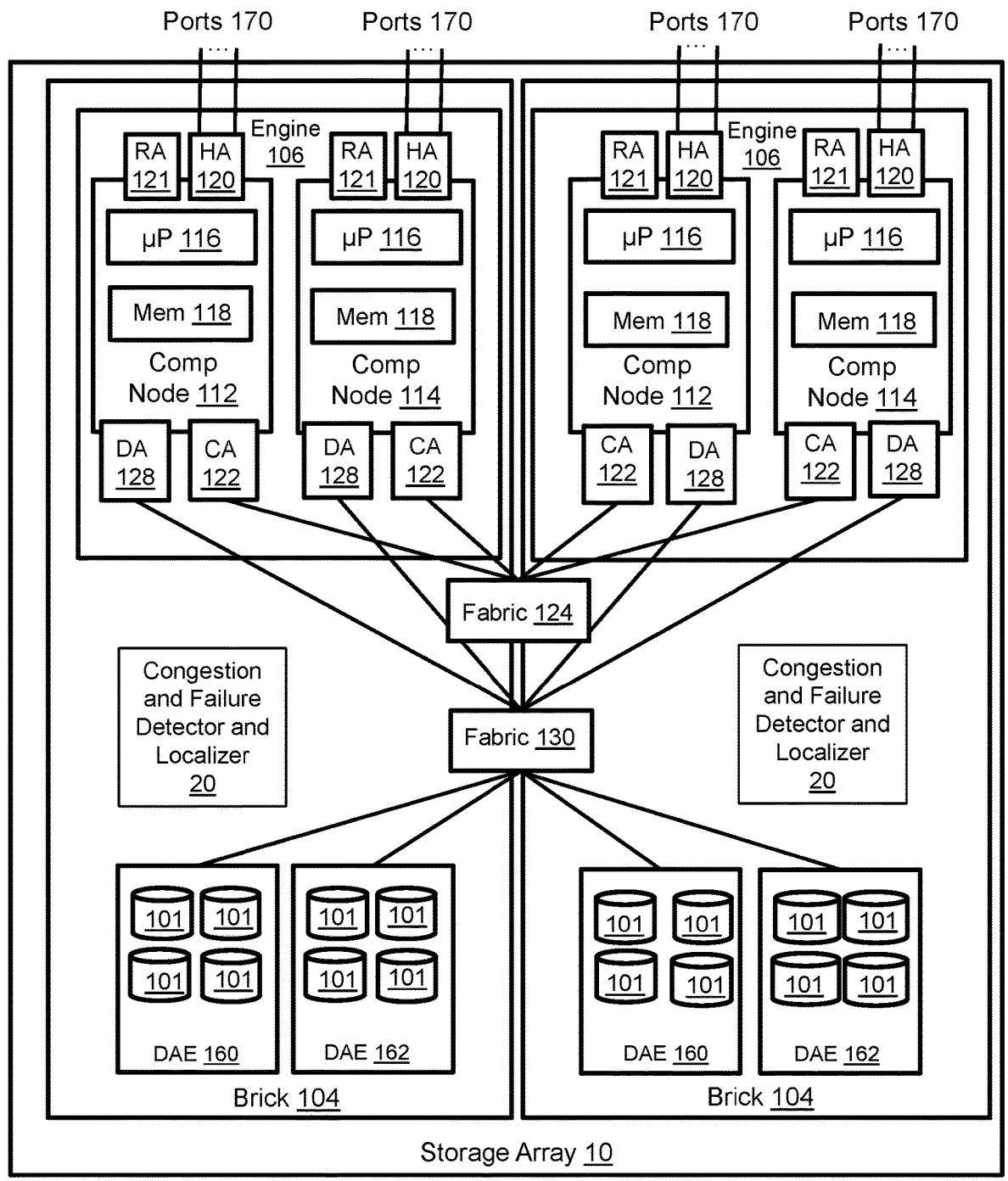
FIG. 2 illustrates the storage array in greater detail.

FIG. 2 illustrates the storage array 10 in greater detail. The storage array 10 includes one or more bricks 104. Each brick 104 includes an engine 106 and one or more disk array enclosures (DAEs) 160, 162. In the illustrated example there are only two engines, but the storage array could include a greater number of engines or a single engine. Each engine 106 includes two interconnected compute nodes 112, 114 that are arranged as a memory-mirrored pair for failover and may be referred to as "storage directors." Although it is known in the art to refer to the compute nodes of a SAN as "hosts," that naming convention is avoided in this disclosure to help distinguish the host servers from the compute nodes 112, 114. Each compute node may be implemented on a separate printed circuit board or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with the host servers. Each host adapter has multiple ports 170 for communicating with the host servers, which may be referred to as "initiators" that send TO commands to the storage array as a "target." Each initiator-target port pair defines a path. Each host server may be connected to the storage array via multiple ports corresponding to multiple paths that enable load balancing and failover. The host adapter resources include processors, volatile memory, and components such as TO chips that monitor link errors and IO failures such as missing frames, timeouts, and received aborts. Each compute node also includes a remote adapter (RA) 121 for communicating with other storage systems, e.g., the other storage arrays. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101. The congestion and failure detector and localizer 20 may run as a distributed program on each of the bricks.

Figure 3:
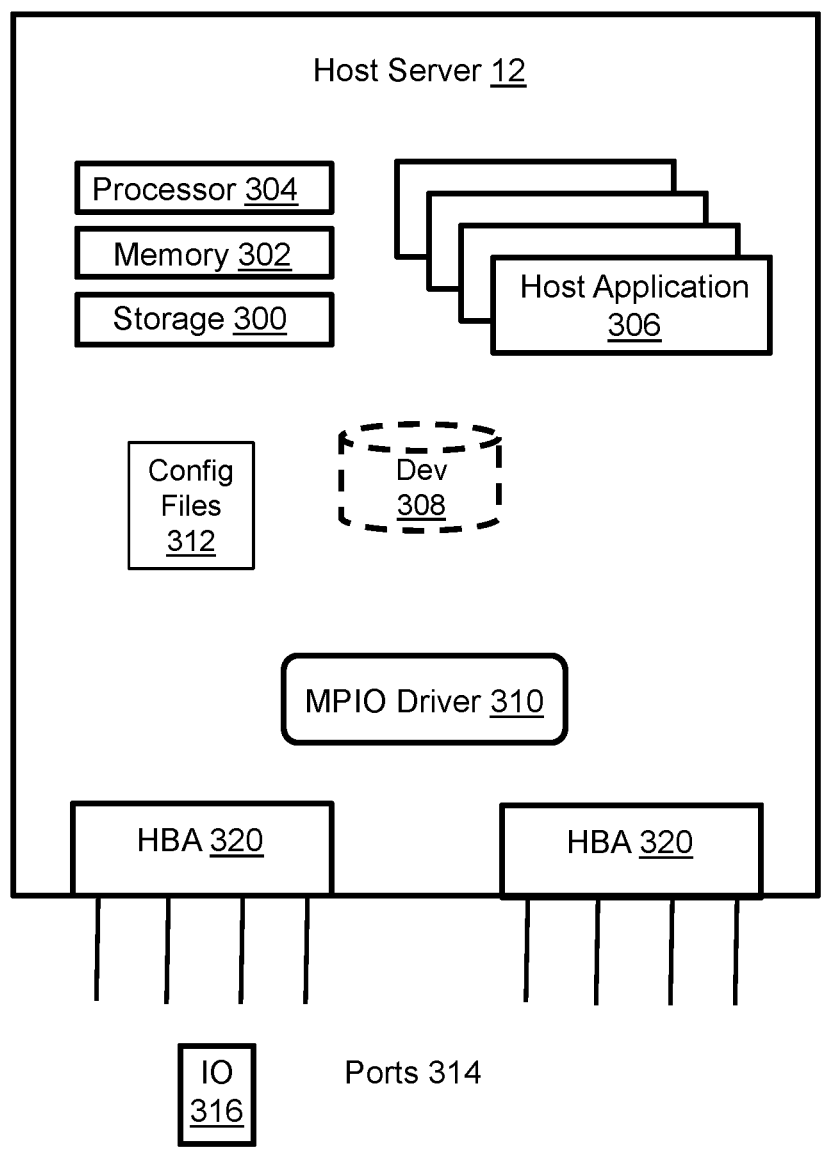
FIG. 3 illustrates one of the host servers in greater detail.

FIG. 3 illustrates one of the host servers 12 in greater detail. Each host server includes volatile memory 302, non-volatile storage 300, one or more tangible processors 304 that support instances 306 of a host application, ports 314, and a Multi-Path Input-Output (MPIO) driver 310 running in the host kernel, and one or more host bus adapters (HBA) 320. Examples of host applications might include, but are not limited to, software for email, accounting, sales, inventory control, manufacturing, and a wide variety of other organizational functions. The MPIO driver 310 discovers a storage object that is maintained and presented by the storage array. A corresponding logical host device 308 that is a representation of that storage object is generated locally for access by the host application instances. The instances of the host application use the logical host device 308 for data access, e.g., to read and write host application data to logical addresses. Corresponding IOs 316 are generated and sent to the storage array via the MPIO driver and HBA to access the storage object to read and write data. More specifically, the MPIO driver selects from among the multiple available paths between the host server and the storage array in order to balance IO loading. The IO is sent to the storage array via the host server and storage array ports corresponding to the selected path. Configuration files 312 maintained by the host server include metadata that describes the paths supported by the host server. For example, the port IDs and authentication credentials for each supported path are included in the configuration files, which may be persistently stored in storage and copied into memory for low latency access during operation. The HBA includes components such as IO chips that monitor link errors and IO failures such as missing frames, timeouts, and received aborts.

Figure 4:
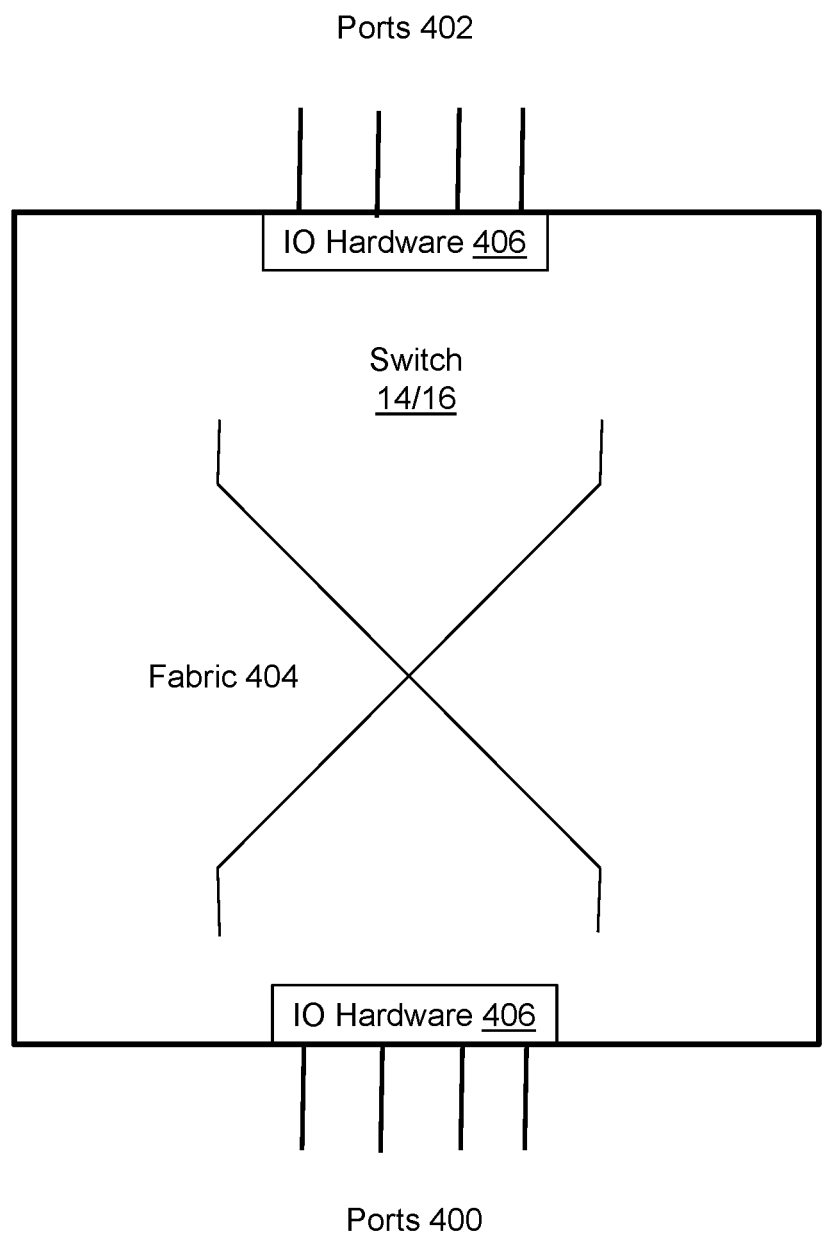
FIG. 4 illustrates one of the switches in greater detail.

FIG. 4 illustrates one of the switches 14/16 in greater detail. Each switch includes a first group of ports 400 that are interconnected with a second group of ports 402 via a fabric 404. For switch 14, ports 402 are host ports on the host server side of the paths and ports 400 are inter-switch link (ISL) ports that connect to ISL ports of a switch 16. For switch 16, ports 402 are ISL ports that connect to a switch 14 and ports 400 are storage ports on the storage array side of paths. The fabric 404 enables any of the ports 400 to be connected to any of the ports 402 to redirect communications along the configured paths. IO hardware 406 associated with the ports includes components such as IO chips that monitor link errors and IO failures such as missing frames, timeouts, and received aborts.

Figure 5:
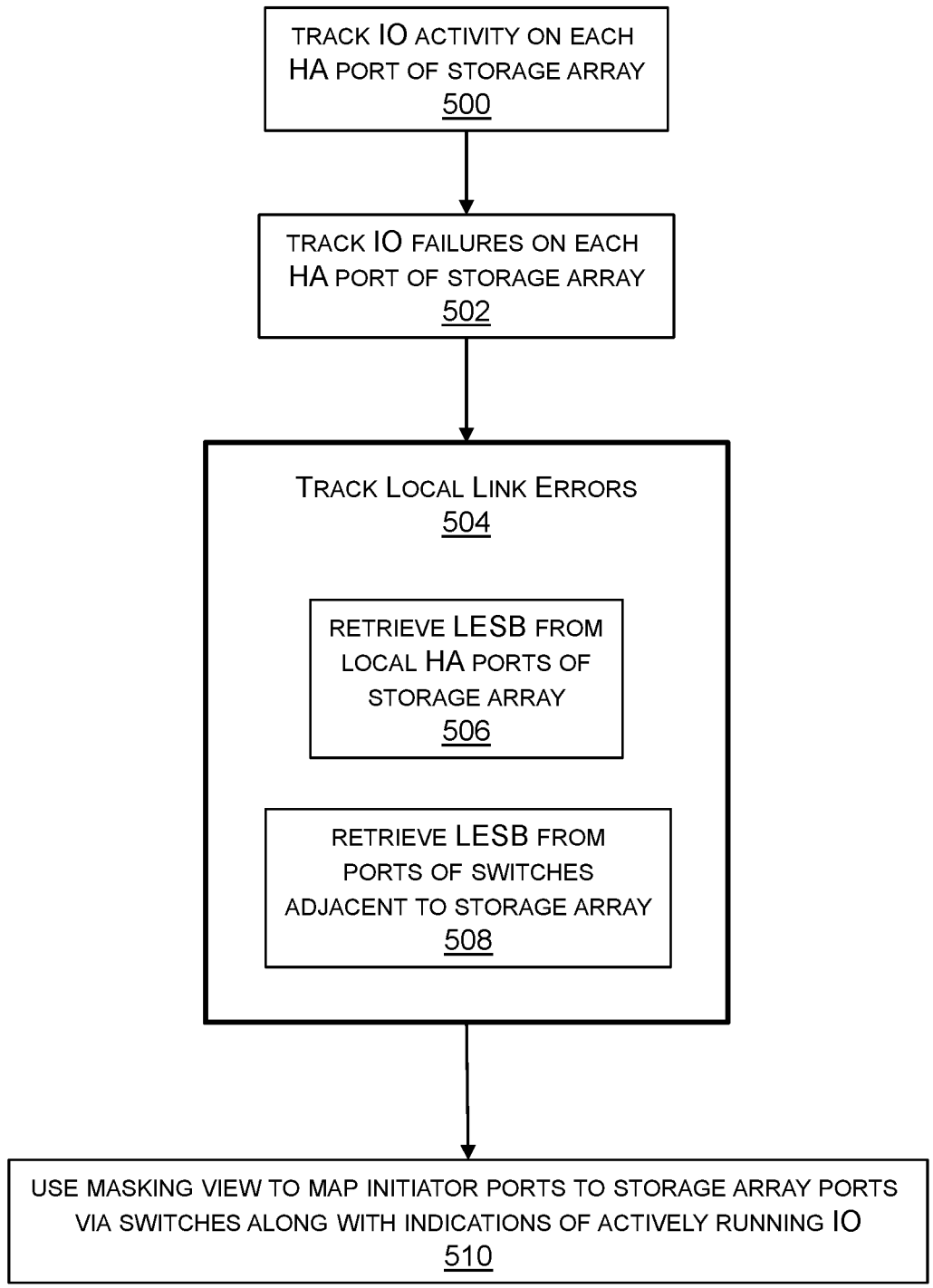
FIG. 5 illustrates a method for mapping the storage system.

FIG. 5 illustrates a method for mapping the storage system. As explained above, the host adapters of the storage array include components that monitor link errors and IO failures such as missing frames, timeouts, and received aborts. The congestion and failure detector and localizer communicates with those components to track IO activity in each host adapter port of the storage array as indicated in step 500. The tracking is performed on an ongoing basis and indicates whether the port is sending data from and/or receiving IOs to storage objects in support of host application instances running on the host servers. The congestion and failure detector and localizer communicates with the host adapter components to track IO failures on each host adapter port of the storage array as indicated in step 502. The tracking is performed on an ongoing basis. The congestion and failure detector and localizer communicates with the host adapter components to track IO local link errors on each host adapter port of the storage array as indicated in step 504. Step 504 includes periodically retrieving link error status blocks (LESBs) from local host adapter ports of the storage array as indicated in step 506. Step 504 also includes remote monitoring by periodically retrieving LESBs from the ports of the switches that are logically adjacent to the storage array as indicated in step 508. This may be accomplished with expression language sessions using read link stat (RLS) or remote desktop protocol (RDP) messages to enable the congestion and failure detector and localizer to communicate with the IO hardware of switches 16 (FIG. 1). The storage array maintains a masking view that indicates which host adapter ports are authorized for use by each host server initiator. Path knowledge, including the masking view, is used to map host server ports to host adapter ports of the storage array via the switches as indicated in step 510. More particularly, the congestion and failure detector and localizer generate the map and associates paths and/or storage array ports with tracked status including indications of actively running IOs, IO failures, and link errors.

Figure 6:
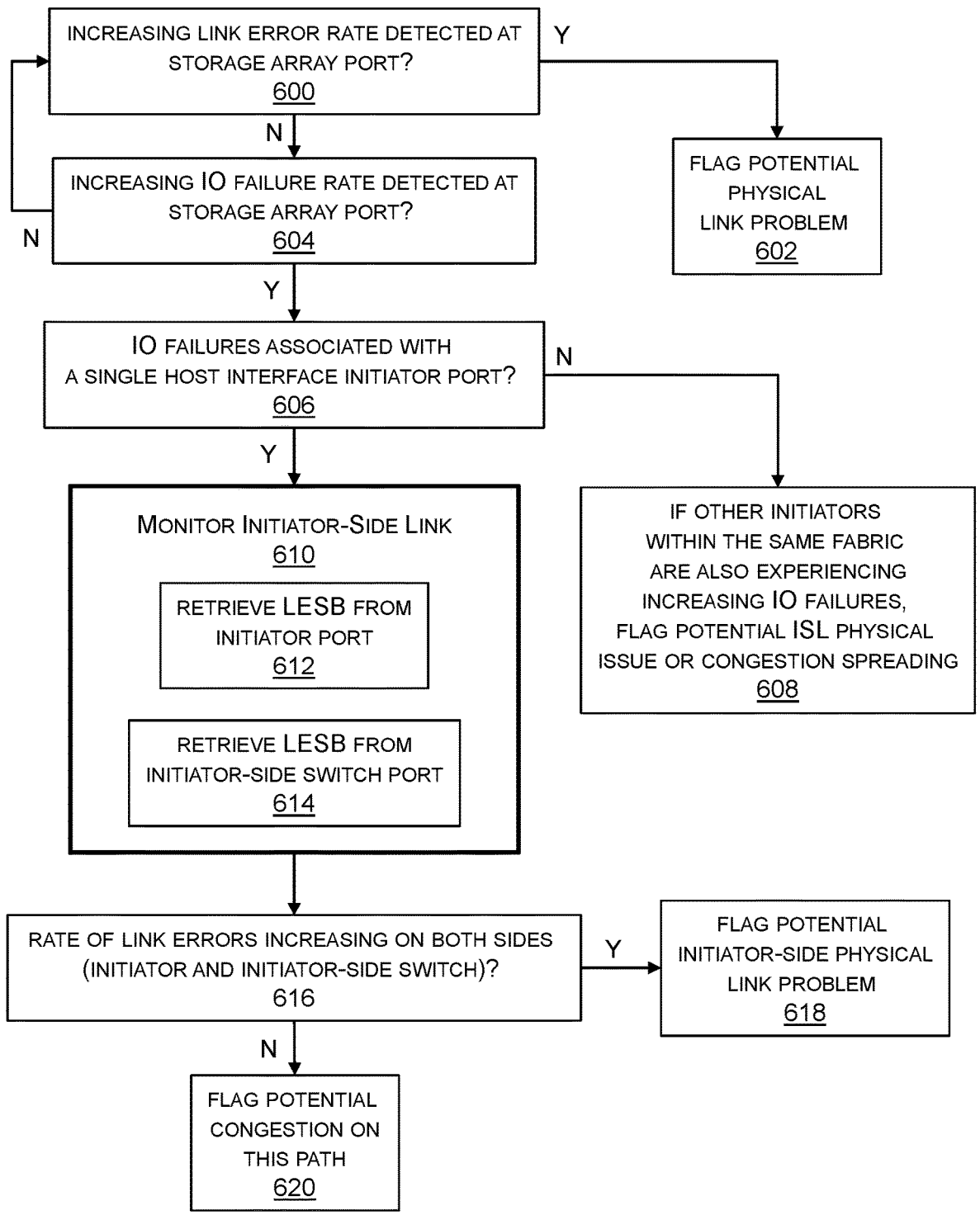
FIG. 6 illustrates a method for detecting and localizing congestion and failures in the storage system based on the mapping.

FIG. 6 illustrates a method for detecting and localizing congestion and failures in the storage system. The congestion and failure detector and localizer monitors each port of the storage array for changes in the rates of link errors and IO failures on an ongoing basis. Step 600 is determining whether the link error rate is increasing at a storage array port. If the link error rate is increasing at a storage array port, then a flag is generated to indicate a potential physical link problem as indicated in step 602. Step 604 is determining whether the IO failure rate is increasing at a storage array port. The congestion and failure detector and localizer monitors each port of the storage array for changes in the rates of link errors and IO failures on an ongoing basis, and thus iterates steps 600 and 604. If the IO failure rate is increasing at a storage array port as determined in step 604, then step 606 is determining whether the IO failures at that port are associated with a single or multiple host initiator ports. If other host initiators within the same fabric are also experiencing increasing IO failure rates, then a flag is generated to indicate a potential inter-switch link (ISL) physical issue or spreading congestion as indicated in step 608. If the increasing IO failure rate is associated with only a single host initiator port as determined in step 606, then the initiator-side link LESB is remotely monitored for some predetermined time interval as indicated in step 610. The LESB is periodically retrieved from the host initiator port by communicating with the host HBA as indicated in step 612. The LESB is periodically retrieved from the initiator-side switch port by communicating with the switch IO hardware as indicated in step 614. If the rate of link errors is increasing on both sides of the link, i.e., the host initiator side and the initiator-side switch, then a flag is generated to indicate a potential initiator-side physical link problem as indicated by step 618. If the rate of link errors is not increasing on both sides of the link, then a flag is generated to indicate potential congestion on the path as indicated in step 620.

Although advantages should not be viewed as necessary or limiting, at least some implementations of the invention may advantageously enable storage arrays to automatically detect and localize congestion and faults. Ongoing monitoring provides baseline status against which comparison can be made. Thus, increasing rates of link errors or IO failures can be used to help identify the type of problem that has occurred. Further, remote monitoring and mapping help to enable the fault or congestion to be localized.

FIG. 7 illustrates a flag 700 generated by the congestion and failure detector and localizer. The flag could be configured as any of the flags mentioned above. The flag includes the fiber channel ID (FCID) and world-wide name of the storage array port at which the conditions that prompted generation of the flag were detected. The suspected issue type is indicated, e.g., physical link or congestion. The suspected link is indicated. The fabric name is listed. If applicable, the initiator FCID and WWN are included. Flags can be logged and sent to various recipients to prompt auto-remediation and notify administrators.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
   monitoring IO failures detected at ports of a storage array;
   monitoring link errors detected at the ports of the storage array;
   remotely monitoring link errors detected at initiator ports of a host server;
   remotely monitoring link errors detected at ports of a switch adjacent to the host server; and
   detecting and localizing a problem based on the monitored IO failures and link errors.

2. The method of claim 1 further comprising remotely retrieving an indication of link errors detected at ports of a switch adjacent to the storage array.

3. The method of claim 2 further comprising mapping the initiator ports to the ports of the storage array.

4. The method of claim 3 further comprising generating an indication of a physical link problem responsive to determining that increasing link error rate is detected at only one of the ports of the storage array.

5. The method of claim 3 further comprising generating an indication of an inter-switch link problem or spreading congestion responsive to determining that increasing IO failure rates are detected at multiple initiator ports.

6. The method of claim 3 further comprising generating an indication of path congestion responsive to determining that increasing IO failure rate is detected at only a single initiator port and the IO failure rate is not increasing on both the initiator port and port of the switch adjacent to the initiator.

7. The method of claim 3 further comprising generating an indication of an initiator-side link problem responsive to determining that increasing IO failure rate is detected at only a single initiator port and the IO failure rate is increasing on both the initiator port and port of the switch adjacent to the initiator.

8. An apparatus comprising:
   a plurality of interconnected compute nodes that manage access to data stored on a plurality of managed drives; and
   a congestion and failure detector and localizer running on at least one of the compute nodes and configured to:
      monitor IO failures detected at ports of a storage array;
      monitor link errors detected at the ports of the storage array;
      remotely monitor link errors detected at initiator ports of a host server;
      remotely monitor link errors detected at ports of a switch adjacent to the host server; and
      detect and localize a problem based on the monitored IO failures and link errors.

9. The apparatus of claim 8 further comprising the congestion and failure detector and localizer being configured to remotely retrieve an indication of link errors detected at ports of a switch adjacent to the storage array.

10. The apparatus of claim 9 further comprising the congestion and failure detector and localizer being configured to map the initiator ports to the ports of the storage array.

11. The apparatus of claim 10 further comprising the congestion and failure detector and localizer being configured to generate an indication of a physical link problem responsive to determining that link error rate at only one of the ports of the storage array is increasing.

12. The apparatus of claim 10 further comprising the congestion and failure detector and localizer being configured to generate an indication of an inter-switch link problem or spreading congestion responsive to determining that increasing IO failure rates are associated with multiple initiator ports.

13. The apparatus of claim 10 further comprising the congestion and failure detector and localizer being configured to generate an indication of path congestion responsive to determining that IO failure rate is increasing at only a single initiator port and the IO failure rate is not increasing on both the initiator port and port of the switch adjacent to the initiator.

14. The apparatus of claim 10 further comprising the congestion and failure detector and localizer being configured to generate an indication of an initiator-side link problem responsive to determining that IO failure rate is increasing at only a single initiator port and the TO failure rate is increasing on both the initiator port and port of the switch adjacent to the initiator.

15. A non-transitory computer-readable storage medium storing instructions that are executed by a storage array to perform a method comprising:

monitoring IO failures detected at ports of the storage array;

monitoring link errors detected at the ports of the storage array;

remotely monitoring link errors detected at initiator ports of a host server;

remotely monitoring link errors detected at ports of a switch adjacent to the host server; and detecting and localizing a problem based on the monitored IO failures and link errors.

16. The non-transitory computer-readable storage medium of claim 15 further comprising remotely retrieving an indication of link errors detected at ports of a switch adjacent to the storage array.

17. The non-transitory computer-readable storage medium of claim 16 further comprising mapping the initiator ports to the ports of the storage array.

18. The non-transitory computer-readable storage medium of claim 17 further comprising generating an indication of a physical link problem responsive to determining that link error rate at only one of the ports of the storage array is increasing.

19. The non-transitory computer-readable storage medium of claim 17 further comprising generating an indication of an inter-switch link problem or spreading congestion responsive to determining that increasing IO failure rates are detected at multiple initiator ports.

20. The non-transitory computer-readable storage medium of claim 17 further comprising generating an indication of path congestion responsive to determining that IO failure rate is increasing at only a single initiator port and the IO failure rate is not increasing on both the initiator port and port of the switch adjacent to the initiator.

* * * * *